United States Patent [19]
Bayley et al.

[11] 3,778,700
[45] Dec. 11, 1973

[54] OPTICALLY PUMPED NUCLEAR MAGNETIC RESONANCE GYROSCOPE

[75] Inventors: Donald S. Bayley, Bedford, N.Y.;
Ivan A. Greenwood, Jr, Stamford, Conn.; James H. Simpson, Jr, Katonah, N.Y.

[73] Assignee: Singer-General Precision, Inc., Little Falls, N.J.

[22] Filed: June 7, 1971

[21] Appl. No.: 150,486

[52] U.S. Cl............................................. 324/0.5 R
[51] Int. Cl........................................... G01r 33/08
[58] Field of Search...................... 324/0.5 R, 0.5 F, 324/0.5 E

[56] References Cited
UNITED STATES PATENTS

| | | | |
|---|---|---|---|
| 3,103,621 | 9/1963 | Fraser | 324/0.5 |
| 3,491,286 | 1/1970 | Simpson | 324/0.5 |
| 3,214,683 | 10/1965 | Andres | 324/0.5 |

Primary Examiner—Michael J. Lynch
Attorney—S. A. Giarratana and Thomas W. Kennedy

[57] ABSTRACT

A nuclear magnetic resonance gyroscope which obtains rotational information from the phases of precessing nuclear magnetic moments for determining the angle of rotation of the gyroscope about a sensitive axis. The gyroscope comprises a pair of spin generators each having a mercury absorption cell containing $^{199}$Hg and $^{201}$Hg. The cells are arranged so that each cell is subjected to a DC $H_0$ magnetic field and to an AC $H_1$ magnetic field in a direction perpendicular to the $H_0$ field. The respective $H_0$ fields are arranged in antiparallel directions. A common pumping lamp provides a beam of randomly polarized light at 2537 A. which is plane-polarized into orthogonal beams of light by a Brewster angle polarizer. The orthogonal beams of light are reflected to intersect the absorption cells in each of the spin generators after being circularly polarized by a quarter wave plate. A common readout lamp provides a source of randomly polarized light which is split into a pair of plane-polarized readout beams which respectively intersect the absorption cells of the spin generators. The readout beam passes through the absorption cell so that its angle of polarization is oscillated by the Faraday effect at the Larmor frequency. The resultant polarization modulated readout beam is converted to an amplitude modulated beam in an analyzer which provides a periodic amplitude varying signal to a photomultiplier detector circuit. The $H_1$ field generator is in circuit with the photomultiplier for generating the $H_1$ field for the absorption cell in the associated spin generator. Readout and control circuit means are provided for comparing the phases of the two resonance signals produced by each absorption cell to produce an error signal for driving a motor to control the displacement of a shaft and to provide a control signal to the $H_0$ field generator to maintain the phase relationships of the respective resonance signals. The angular rotation of the shaft will be proportional to the rotation of the gyroscope about the sensitive axis, parallel to the $H_0$ direction, with respect to inertial space. One embodiment of the mechanical structure for housing a portion of the gyroscope is also disclosed.

18 Claims, 5 Drawing Figures

INVENTORS
DONALD S. BAYLEY
IVAN A. GREENWOOD, JR. &
JAMES H. SIMPSON, JR.

BY
ATTORNEY

OPTICALLY PUMPED NUCLEAR MAGNETIC RESONANCE GYROSCOPE

BACKGROUND OF THE INVENTION

The invention herein described was made in the course of or under a contract, or subcontract thereunder with the Department of the Navy.

This invention relates to a gyroscope. More particularly, this invention relates to a nuclear magnetic resonance gyroscope which measures the angle of rotation about a predetermined sensitive axis. Still more particularly, this invention relates to a nuclear magnetic resonance gyroscope which obtains rotational information from the phases of precessing nuclear magnetic moments.

A number of approaches have been suggested in the prior art for instrumenting the basic concept of the nuclear gyroscope. Thus, the prior art has produced a number of devices which utilize a nuclear magnetic resonance controlled oscillator as the fundamental sensor unit for a gyroscope wherein the rotational information is obtained from the phases of the nuclear magnetic resonance signals by means of suitable phase comparison and field control circuitry.

In general, each of these devices contains significant deficiencies which limit the development of a suitable instrument. For example, such devices have been sensitive to ambient magnetic field changes in the geometry of the system, and have not been designed to minimize sensitivity to changes in the angular profile of the light beam intensity.

Thus, it is the aim of this invention to provide a nuclear magnetic resonance gyroscope having a geometry which lends it to magnetic shielding and which utilizes a Faraday readout.

It is another object of this invention to provide a device which uses a simplified phase detection circuit for comparing the phases from the nuclear magnetic resonance spin generators to produce an output indication of the rotation of the device.

It is still another object of the invention to provide an optically-pumped nuclear resonance gyroscope which utilizes a common pumping lamp and a common readout lamp for a pair of spin generators.

It is still another object of the invention to provide a gyroscope which obtains rotational information from the phases of precessing magnetic moments derived from a mercury absorption cell containing two isotopes of mercury.

It is an overall object of this invention to provide a method and apparatus for determining rotational information from the phases of precessing nuclear magnetic moments.

These and other objects of the invention will become apparent from a review of the written description of the drawings taken on conjunction with the accompanying drawings.

BRIEF SUMMARY OF THE INVENTION

The nuclear magnetic resonance gyroscope according to the invention comprises nuclear magnetic resonance means, including a pair of spin generators, for generating the nuclear magnetic resonant signals in circuit with means for comparing the phases of the nuclear signals from each spin generator for providing an output signal proportional to the angle of rotation. Each spin generator comprises a mercury absorption cell containing $^{199}Hg$ and $^{201}Hg$ which is subjected to a DC magnetic $H_0$ field and to an AC $H_1$ magnetic field in a direction perpendicular to the $H_0$ field. The $H_0$ fields are preferably anti-parallel to one another. Each mercury absorption cell in each spin generator is optically pumped by a circularly polarized beam of light at a wave length having an optical center at 2537 A. The pumping beam for each cell is provided from a randomly polarized beam of light produced by a common pumping lamp and is separated into its planar polarized components by separation in a Brewster angle polarizer. The orthogonal beam of light is reflected to intersect the absorption cells in each spin generator after being circularly polarized by a properly oriented quarter wave plate. The readout beams for each spin generator are derived from a second common lamp and separated into two linearly polarized beams by a second Brewster angle polarizer which respectively intersect the mercury absorption cells. Each readout beam passes through the absorption cell so that its axis of polarization is oscillated by the Faraday effect at the Larmor frequency. The readout beams are converted to amplitude modulated beams in a linear analyzer which provides a periodic amplitude varying signal to a photomultiplier detector circuit. The $H_1$ field generator is in circuit with the photomultiplier for generating the $H_1$ field for the absorption cell in the associated spin generator. Readout and control circuit means are provided for comparing the phases of the two resonance signals produced by the isotopes of mercury of each absorption cell to produce an error signal for driving a motor to control the displacement of a shaft and to provide a control signal to the $H_0$ field generator of one of the cells to maintain the phase relationships of the respective resonance signals. The angular rotation of the shaft is proportional to the rotation of the gyroscope about the sensitive axis determined by the direction of the $H_0$ field.

DETAILED DESCRIPTION OF THE PREFERRED EMBODIMENT

Figure 1:
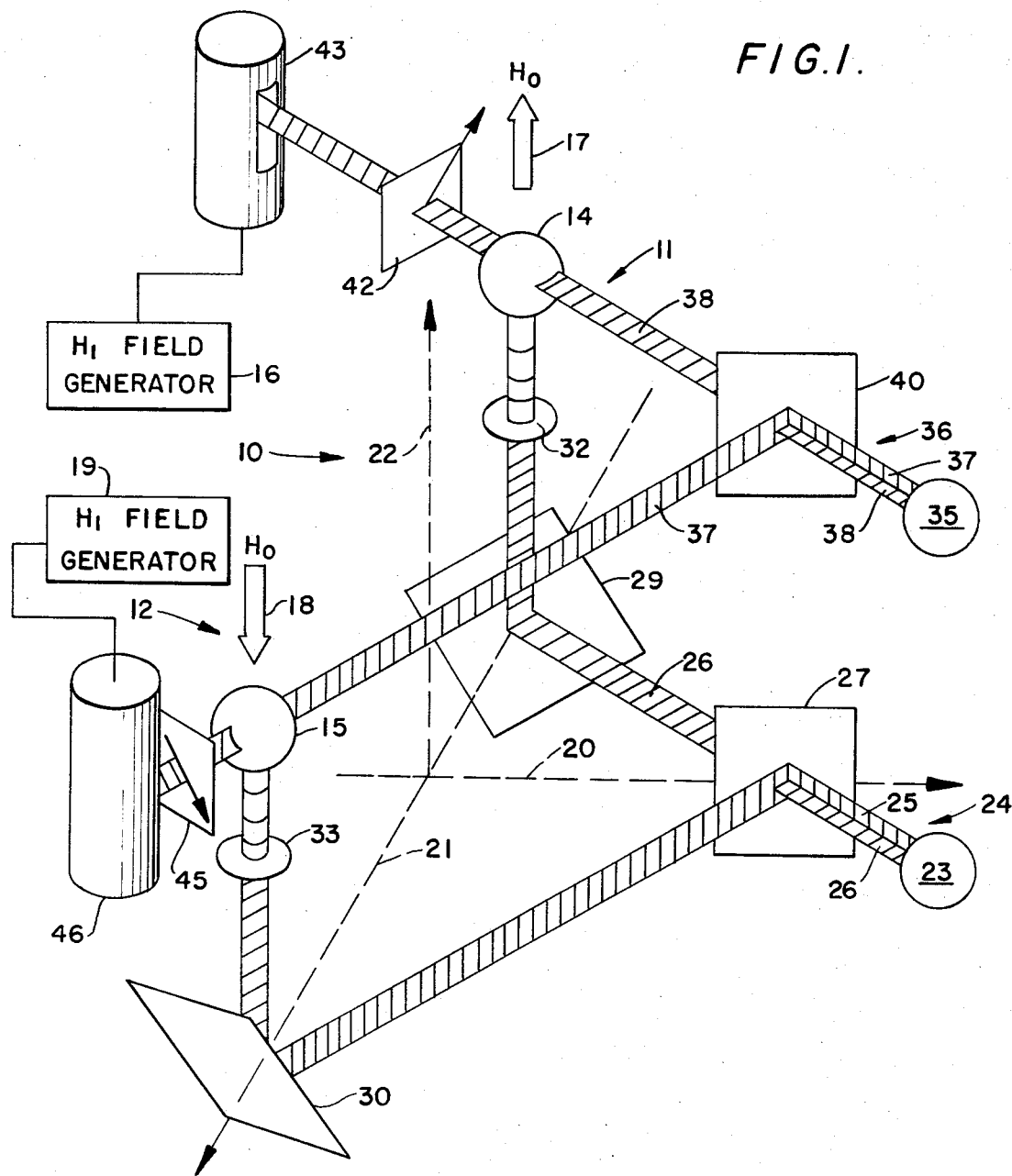
FIG. 1 is a schematic view of the apparatus according to the invention showing the central components arranged in their proper geometrical relationship.

In FIG. 1, the nuclear gyroscope according to the invention is designated generally by the reference numeral 10. The gyroscope 10 comprises a first spin generator designated generally by the reference numeral 11 and a second spin generator designated generally by the reference numeral 12. Each spin generator acts as the basic sensing unit for the gyroscope and serves as an oscillator which effectively simultaneously operates at two frequencies $\omega_1$ and $\omega_2$. The output frequencies of each spin generator are controlled in the invention by the rotation of the gyroscope about the predetermined sensitive axis 22 so that the angle of rotation is added algebraically to the phase of each oscillation from the spin generator and by the use of an applied control current to the spin generator which increases each output frequency of the spin generator by a proportional amount so that the ratio of the frequencies remains constant in the absence of rotation.

The phases of the oscillations from each spin generator are given by the following equations:

$$\phi_{11} = \int \gamma_1 H_{01} dt + \phi_0$$

(1)

$$\phi_{21} = \int \gamma_2 H_{01} dt + \phi_0$$

$$\phi_{12} = \int \gamma_1 H_{02} dt - \phi_0$$

(1)

$$\phi_{22} = \int \gamma_2 H_{02} dt - \phi_0$$

where $\gamma_1$ and $\gamma_2$ are the gyromagnetic ratios of the Hg nuclei in the absorption cell; $H_{01}$ and $H_{02}$ are the magnetic fields proportional to the current applied to the coils which produce the fields; $\phi_0$ is the angle of rotation of the spin generator about the predetermined sensitive axis; $\phi_{11}$ and $\phi_{21}$ are the phases of the output signals from spin generator 11 and $\phi_{12}$ and $\phi_{22}$ are the phases of the output signals of spin generator 12. $\phi_{11}$ and $\phi_{12}$ are the phases of the signals whose frequency is $\omega_1$, while $\phi_{21}$ and $\phi_{22}$ are the phases of the signals whose frequency is $\omega_2$.

The angle of rotation is obtained by comparing the phases of the two pairs of signals. If the phase difference in the signals of one frequency from the two spin generators is maintained equal to the phase difference between the signals of the other frequency, the phase difference from either spin generator is twice the angle of rotation of the gyroscope about the sensitive axis. Thus if $$\phi_{11} - \phi_{12} = \phi_{21} - \phi_{22}$$

(2)

then for both, $$\phi_{11} - \phi_{12} = 2\phi_0, \text{ and } \phi_{21} - \phi_{22} = 2\phi_0$$

(3)

The condition of equation (2) above may be maintained by developing an error signal from the difference between the respective phase differences of the outputs from the two spin generators. The error signal is used as a control signal to control the current through the coil which generates the magnetic field $H_0$ to maintain the error signal at a null.

The gyroscope 10 includes circuitry shown in FIG. 3 which will be discussed in greater detail for comparing the phases of the output signals from the two spin generators 11 and 12 and for generating control and output signals as described above. The output signal produced is proportional to the angle of rotation of the gyroscope 10 about the sensitive axis.

The spin generator 11 includes an optically pumped and an optically monitored magnetic resnoance element which comprises a coil assembly (not shown in FIG. 1) having a mercury absorption cell 14 at its center. Similarly the spin generator 12 includes a mercury absorption cell 15 located at the center of a multiple coil assembly (not shown in FIG. 1). A first field coil (not shown) generates a DC magnetic $H_0$ field, designated generally by the reference numeral 17, for the spin generator 11 while a second field coil (not shown) generates a second DC magnetic $H_0$ field, designated generally by the reference numeral 18, for the spin generator 12.

For clarity, the orientation of the components in the apparatus shown in FIG. 1 will be related to an arbitrary $x$, $y$, $z$-axis coordinate system to aid in visualizing the spatial relationship of the components and to indicate the polarization of the pumping and readout light beams which will be described in detail. The $x$, $y$, and $z$-axes are designated generally be the reference numerals 20, 21, and 22 respectively. Thus, the $H_0$ field 17 is in the positive $z$ direction, while the $H_0$ field 18 is in the negative $z$ direction, so that the field 18 is thus antiparallel to the field 17.

Each of the mercury absorption cells 14 and 15 preferably contains two isotopes of mercury, i.e., $^{199}$Hg and $^{201}$Hg. When the DC $H_0$ magnetic field has a strength of about 1.3 gauss, the resonance frequency of $^{199}$Hg is approximately 1 kHz while the resonance frequency of $^{201}$Hg is about 369 Hz. When each mercury cell is illuminated by light in a waveband having a nominal optical center at 2537 A., the mercury atoms in the cell absorb light in this region and are excited from the ground state to the first excited level, since light at that wavelength is in resonance with the mercury atoms in the mercury cell.

The atoms of mercury in each absorption cell possess a magnetic moment due to their intrinsic angular momentum or spin properties. When a collection or ensemble of such spins is subjected to the influence of a substantially homogeneous static magnetic field $H_0$, the orientations of the magnetic moments will be quantized or split into a series of ground states having predeterminable energy separations. After the relaxation time of the mercury has elapsed, the ensemble reaches thermal equilibrium wherein slightly more than half of the particles have lined up in a direction parallel to the direction of $H_0$, corresponding to relatively low ground states, while the remaining portions have lined up in a direction antiparallel to the magnetic field, corresponding to relatively higher ground states. Thus, each mercury cell 14 and 15 exhibits a resultant macroscopic magnetic moment per unit volume in the direction of the applied field $H_0$.

A pumping lamp 23 provides a beam 24 of randomly polarized light which may be resolved into components in a first plane designated by the numeral 25 and a second plane designated by the numeral 26. The light output from the lamp 24 is directed upon a Brewster angle polarizer 27 which acts as a beam splitter. The components of the light in the plane 26 are transmitted therethrough and are reflected from a mirror 29 in a direction parallel to the $z$ axis 22. The components of the light in the plane 25 are reflected from the Brewster angle polarizer 27 and are reflected from the mirror 30 in a direction parallel to the $z$ axis 22. The linearly polarized light reflected from the mirror 29 is circularly polarized by the quarter wave plate 32 and intersects the mercury absorption cell 14. The linearly polarized light reflected from the mirror 30 is circularly polarized by the quarter wave plate 33 and intersects the mercury absorption cell 15.

A readout lamp 35 produces a beam of randomly polarized light 36 which contains components of light polarized in the direction of the plane designated by the reference numeral 37 and light polarized in the plane designated by the reference numeral 38. The beam 36 from the lamp 35 intersects the Brewster angle polarizer 40 which transmits the components of light polarized in the plane 38 to intersect the mercury cell 14. Similarly, the components of light polarized in the plane 37 in the beam 36 are reflected from the Brewster angle polarizer 40 and intersect the mercury absorption cell 15.

The geometry shown in FIG. 1 is determined in large part by the Brewster angle $\phi_b$, determined from the relationship $\tan \phi_B = n$, where n is the index of refraction of the material of the polarizer. Preferably, each Brewster angle polarizer is made from stacks of thin plates of fused quartz. For fused quartz, n = 1.509, so that $\phi_b$ = 56° 28' as measured from a normal to the reflecting surface. When the incident light beam is at the Brewster angle, the reflected light beam is linearly polarized parallel to the plane of the reflecting surface and the transmitted beam is partially linearly polarized perpendicularly to the polarization of the reflected beam.

Figure 2:
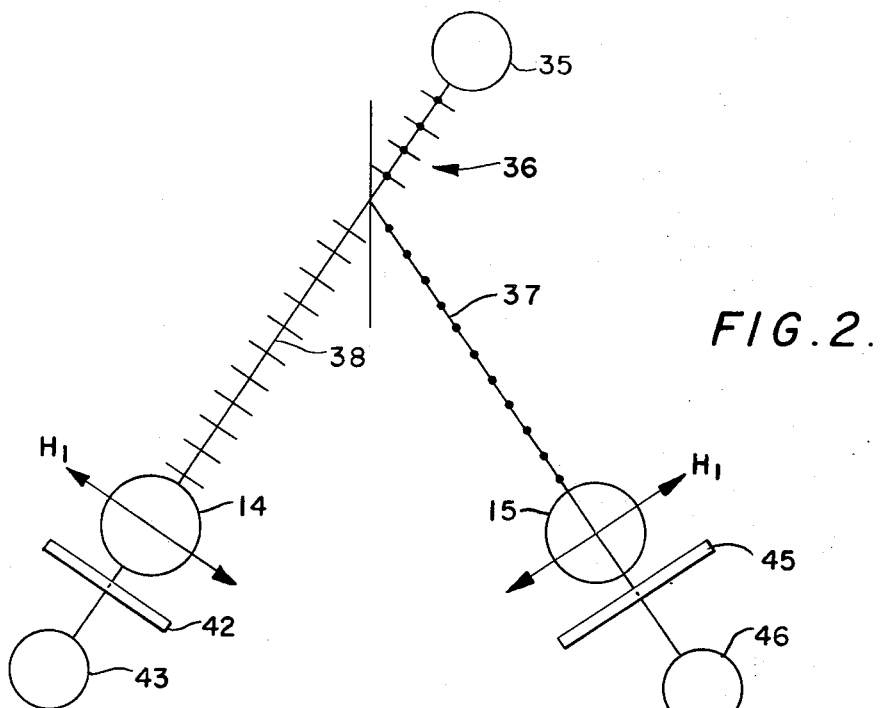
FIG. 2 is a plan view from the top of FIG. 1 showing the AC $H_1$ field intersecting the absorption cells.

Each of the mercury absorption cells 14 and 15 is also subjected to an AC $H_1$ field produced by field coils (not shown). The $H_1$ fields are perpendicular to the $H_0$ fields as shown in FIG. 2. The direction of travel of each of the readout beams 37 and 38 through the cells 14 and 15 is perpendicular to both $H_1$ and $H_0$.

The $H_1$ field applied to cell 14 is produced by the field generator 16 in circuit with the output of the spin generator 11 while the $H_1$ field applied to cell 15 is produced by the field generator 19 in circuit with the output of the spin generator 12. Each field generator 16 and 19 includes a phase stable amplifier for receiving and amplifying the output of the spin generator and a field coil oriented with respect to the absorption cell produces an $H_1$ field along the axis of the field coil and perpendicular to the $H_0$ field.

When the polarized spin ensemble in either of the mercury absorption cells 14 and 15 is subjected to an alternating magnetic field $H_1$, perpendicular to the $H_0$ field, of the proper frequency, it will induce transitions in the mercury from one ground state level to the other ground state level. Each transition between energy levels corresponds to a reorientation of a nuclear spin in the magnetic field $H_0$. Thus, if a mercury nucleus absorbs sufficient energy to make a transition from a lower energy ground state to the upper energy ground state, the orientation of the nucleus changes from parallel to antiparallel with respect to the $H_0$ field direction. Since there are more nuclei in the lower energy state at thermal equilibrium, there is an increased probability that energy will be absorbed from the alternating $H_1$ field causing lower energy mercury nuclei to make transitions to the higher energy state in a manner tending to equalize the number of nuclei in each ground state level. During this absorption process, however, the mechanism of relaxation causes sufficient numbers of nuclei in the higher energy ground state to make incoherent transitions to the lower energy ground state tending to restore thermal equilibrium. As a result, the net magnetization of the spin system corresponding to a finite population difference between the respective ground state levels will be preserved during the absorption of energy from the $H_1$ field. The amount of enerby absorbed by this spin system reaches a maximum as the frequency of the $H_1$ field generator approaches the Larmor frequency, that is, the frequency required to induce a transition between the two quantized energy states.

The alternating magnetic field $H_1$ has the effect of applying a torque to the magnetic moment of the mercury absorption cell causing it to tilt away from the $H_0$ field and to process about the axis of the $H_0$ field at the Larmor angular frequency. The Larmor precessional frequency is given by:

$$\omega = - \gamma H_0 \qquad (4)$$

where $\omega$ is the Larmor precession frequency, $\gamma$ is the gyromagnetic ratio, and $H_0$ is the applied DC magnetic field. The negative sign in equation (4) demonstrates that a nucleus with a positive gyromagnetic ratio will precess in a counter-clockwise direction when viewed along a direction parallel to the direction of $H_0$, i.e., according to the left hand rule with the thumb in the direction of $H_0$ and the fingers in the direction of $\omega$.

The precessing magnetic moment will have a component which is perpendicular to the $H_0$ field and may be considered to rotate about the axis of the $H_0$ field.

The readout beams 38 and 37 pass through the mercury cells 14 and 15 respectively and the angle of the plane of polarization is modulated at the Larmor frequency by the Faraday effect on the readout beam caused by the magnetic moment component rotating about the $H_0$ axis. The modulation of the angle of the plane of polarization of the readout beam 38 is converted to an amplitude modulation by passing the polarization modulated beam through the linear analyzer 42 and the amplitude modulation is detected in the photomultiplier 43. Similarly, the readout beam 37 is polarization modulated in the mercury cell 15 and is passed through the linear analyzer 45 and is detected in the photomultiplier 46. The output current from each of the photomultiplier tubes is amplified and used to generate the alternating field $H_1$.

The circularly polarized light applied to the cells 14 and 15 optically pumps the cells to increase the strength of the magnetic moment component and thus increase the signal to noise level of the output signal. The circularly polarized light has the effect of interacting with the mercury atoms in the cells 14 and 15 to pump the atoms from predominantly the upper energy ground state to an excited state. The atoms, however, return to both ground states resulting in an increase in the population of atoms in the lower energy ground state. As a result the magnetic moment produced by the excess population of atoms in the lower energy ground state is increased in strength. When this magnetic moment is caused to precess, the strength of the component rotating about the $H_0$ axis is increased. Accordingly, the amplitude of the output signal produced by the Faraday effect of the rotating magnetic moment component is increased.

When all of the conditions of alignment are precisely met, each of the mercury isotopes in the spin generators 11 and 12 will oscillate at its Larmor precessional frequency as indicated above.

When a beam of plane polarized light having a velocity parallel to a magnetic field is caused to pass through that magnetic field, the plane of oscillation of the light is rotated through an angle as a result of the Faraday effect. When a plane polarized beam 38 of light is caused to pass through the mercury cell 14, it will be affected by the magnetic moment component rotating about the $H_0$ axis and the angular position of the plane of polarization of the light will oscillate with respect to time at the Larmor frequency. Thus, the polarization of the light beams 37 and 38 will be modulated by the cells 15 and 14 respectively. The analyzers 45 and 42 convert this polarization modulation to an intensity modulation. By properly orienting the direction of the analyzers 45 and 42, the components of this intensity modulation at a Larmor frequency can be maximized.

Since two isotopes of mercury are contained within each absorption cell, two such signals are produced, each having been modulated at the characteristic Larmor precessional frequency in accordance with the gyromagnetic ratio for each isotope. Thus, the net output signal is amplitude modulated simultaneously at two frequencies which correspond to each of the characteristic frequencies of the isotopes in the mercury cell.

Thus far, the gyroscope operation has been described for a gyroscope which is fixed in inertial space.

When the gyroscope rotates about the $H_0$ axis, the phase relationships are affected in accordance with equation (1) above. That is, the relative phase of the signal at each frequency at the output of each spin generator after rotation is displaced in phase from the signal received under non-rotation conditions. This relative displacement is thus used to provide an output representative of the degree of rotation of the gyroscope.

Figure 3:
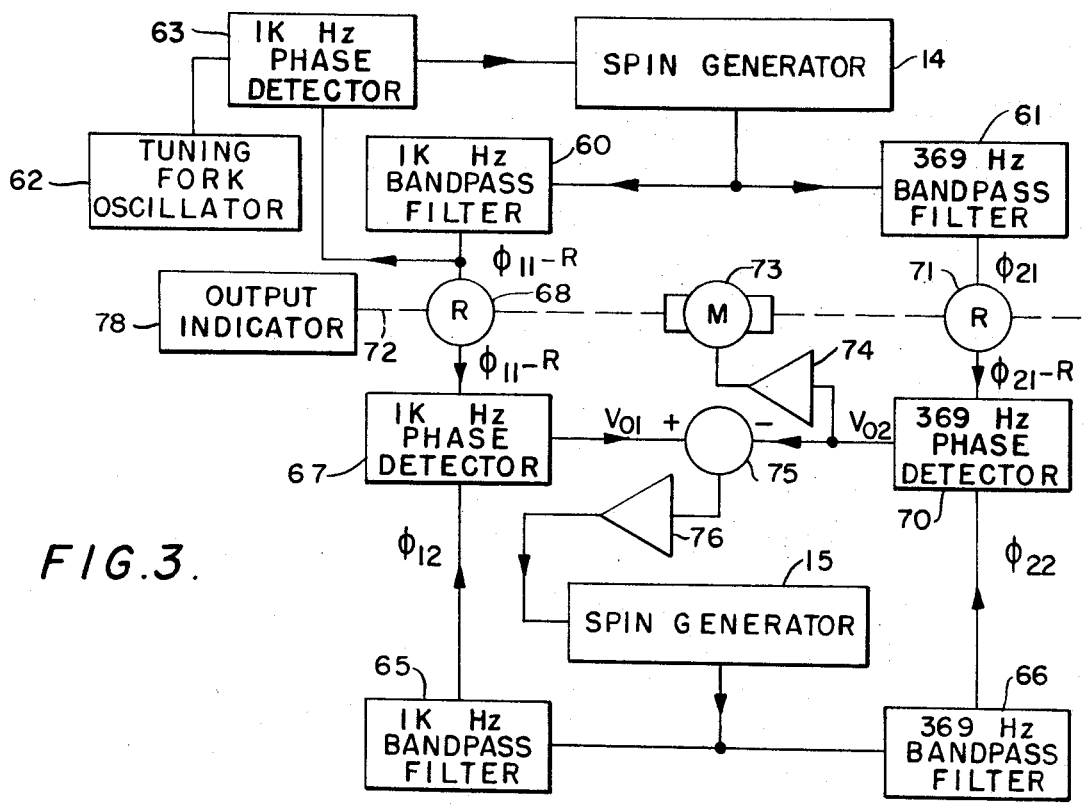
FIG. 3 is a block diagram of the circuit for comparing the phase signals from the respective spin generators and generating a readout signal therefrom.

The phase detection and output circuitry is shown generally in block form in FIG. 3. The purpose of this circuit is to maintain the equality of the phase differences of the oscillations at each Larmor frequency shown by equation (2) above, and to provide an output signal proportional to the phase difference of each pair of signals.

For the phase comparator shown in FIG. 3, the output 72 is in the form of a shaft position. A shaft encoder may be used to provide a digital output for recording the shaft position, while an analog output for recording the shaft position may be derived from a voltage proportional to the shaft angle. One means of obtaining such a voltage is by driving the wiper on a potentiometer across which a DC voltage is imposed.

In FIG. 3, the two resonance signals from the spin generator 14 are separated by the use of narrow band filters 60 and 61. The filter 60 is a 1 kHz band pass filter, while the filter 61 is a 369 Hz band pass filter. The $^{199}$Hg signal is at 1 kHz and that signal from the spin generator 14 is locked to the frequency of a stable frequency reference, such as a tuning fork oscillator 62 in circuit with a 1 kHz phase detector 63. The phase detector 63 responds to any variation in phase between the output of the tuning fork oscillator and the 1 kHz output of the filter 60 to vary the $H_0$ field in the spin generator to eliminate the phase difference. In this manner the 1 kHz signal is locked to the phase of the tuning fork oscillator and in this manner phase stabilization in the spin generator 14 is achieved. The output from the filter 60 is $\phi_{11}$, while the output from filter 61 is $\phi_{21}$, as defined above in equation (1).

The output signals from the spin generator 15 are separated by a 1 kHz band pass filter 65 and a 369 Hz band pass filter 66. The output from the filter 65, $\phi_{12}$, is in circuit with the 1 kHz phase detector 67 which also receives the output from a resolver 68 in circuit with the output of the band pass filter 60. Similarly, the output from the filter 66, $\phi_{22}$, is in circuit with the 369 Hz phase detector 70 which also receives the output from a resolver 71 in circuit with the 369 Hz band pass filter 61.

The signals from the spin generator 14 are effectively shifted in phase by the action of the resolvers 68 and 71 which are connected to a shaft 72, shown in phantom and driven by the motor 73. The output from the 369 Hz phase detector 70, designated as $V_{02}$, is amplified by the amplifier 74 to energize the motor 73 for positioning the shaft 72 and actuating the resolvers 68 and 71. The angular position of the shaft 72 is a measure of the angular position of the gyroscope in inertial space.

The difference between the output of the 1 kHz phase detector 67, designated $V_{01}$, and the 369 Hz phase detector 70, designated $V_{02}$, is compared in the comparator 75, the output of which is amplified by the amplifier 76 to provide a control signal to control the DC magnetic field $H_0$ in the spin generator 15.

The equations which represent the output of the spin generators were previously set forth in equation (1). $\phi_{11}$ is the output from the filter 60, while $\phi_{21}$ is the output from the filter 61. $\phi_{12}$ is the output from the filter 65, while $\phi_{22}$ is the output from the filter 66. The output from the resolver 68 is thus represented by $\phi_{11}$ — R where R represents the phase displacement due to the position of the shaft 72 as sensed by the resolver 68, while the output from the resolver 71 is represented by the $\phi_{21}$ —R. $\phi_{11}$ is thus the phase angle of the output of $^{199}$Hg component of the spin generator 14, while $\phi_{21}$ is the output of the $^{201}$Hg component of the spin generator 14. $\phi_{12}$ is the output of the $^{199}$Hg component of the spin generator 15, while $\phi_{22}$ is the $^{201}$Hg output from spin generaotr 15.

Since the fields applied to the spin generator 14 and 15 are antiparallel, rotation of the gyroscope about the $H_0$ axis will add to the phases of the outputs of one spin generator and subtract from the phases of the outputs of the other spin generator.

When the system is in equilibrium, the phase of the output signal of the resolver 71, $\phi_{21}$ — R will be equal to the phase of the output signal of the filter 66, $\phi_{22}$ and the phase of the output signal of the resolver 68, $\phi_{11}$ — R, will be equal to the phase of the output signal of the filter 65 so that $V_{01}$ and $V_{02}$ are zero. When the gyroscope is rotated in one direction about the $H_0$ axis, the phase of the signals from the spin generator 14, i.e., $\phi_{11}$ and $\phi_{21}$ will increase while the phase of the signals $\phi_{12}$ and $\phi_{22}$ from the spin generator 15 will decrease. Before rotation of the shaft 72, phase $\phi_{11}$ — R and $\phi_{21}$ — R will change with $\phi_{11}$ and $\phi_{21}$ and the change in the relative phase difference is detected in the phase detectors 67 and 70. The resulting output signal $V_{02}$ of the phase detector 70 energizes the motor 73 to rotate the shaft 72 in a direction to change the phase $\phi_{21}$ — R applied to the phase detector 70 to be equal to the phase $\phi_{22}$ of the output signal of the filter 66. The phase $\phi_{11}$ — R of the signal applied to the phase detector 67 from the resolver 68 is changed by the rotation of the shaft 72 by an amount equal to the change in phase of $\phi_{21}$ — R effected by the rotation of the shaft 72 and produces a corresponding change in the output signal $V_{01}$ from the phase detector 67. As indicated above, in order for the difference between the phases $\phi_{21}$ and $\phi_{22}$ to represent the angular position of the gyroscope about the input axis, this phase difference must equal the difference between $\phi_{11}$ and $\phi_{12}$. The output signal $V_{01}$ of the phase detector 67 is used to maintain this equality of phase differences. If the phase differences are equal, then $V_{01}$ will equal $V_{02}$. If the phase differences start to change relative to one another, the signal $V_{01}$ will become unequal to $V_{02}$ and the difference will be detected by the comparator 75. The resulting output signal of the comparator 75 is amplified by the amplifier 76 and is used to correct the $H_0$ field applied to the spin generator 12 to maintain the phase differences equal.

Physically, the gyroscope is assembled in a structure that provides for the placement and support of the optics, coil structure, and magnetic shield at the outer periphery thereof. The portions of the gyroscope as shown in FIGS. 4 and 5 include a heat shield 92 surrounding a ferrite magnetic shield 93 which contains the spin generator assembly shown therein.

Figure 4:
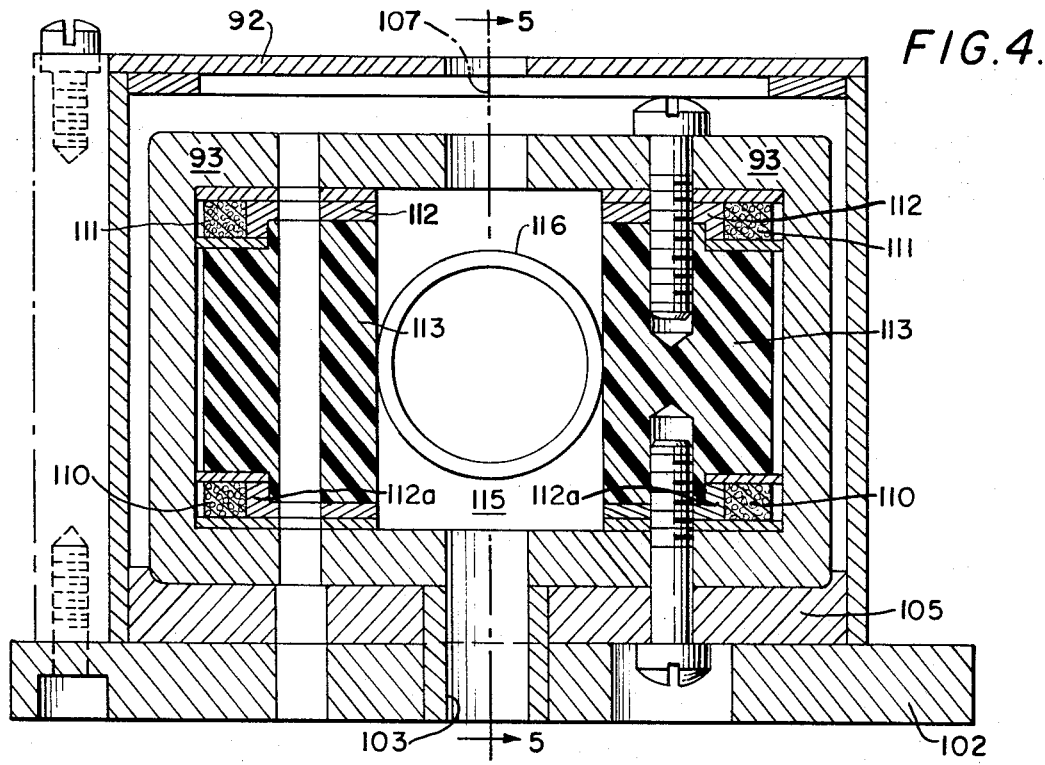
FIG. 4 is a sectional view of a spin generator assembly with the absorption cell removed taken in a plane containing the centers of the mounting holes and the axis of the $H_0$ magnetic field.
Figure 5:
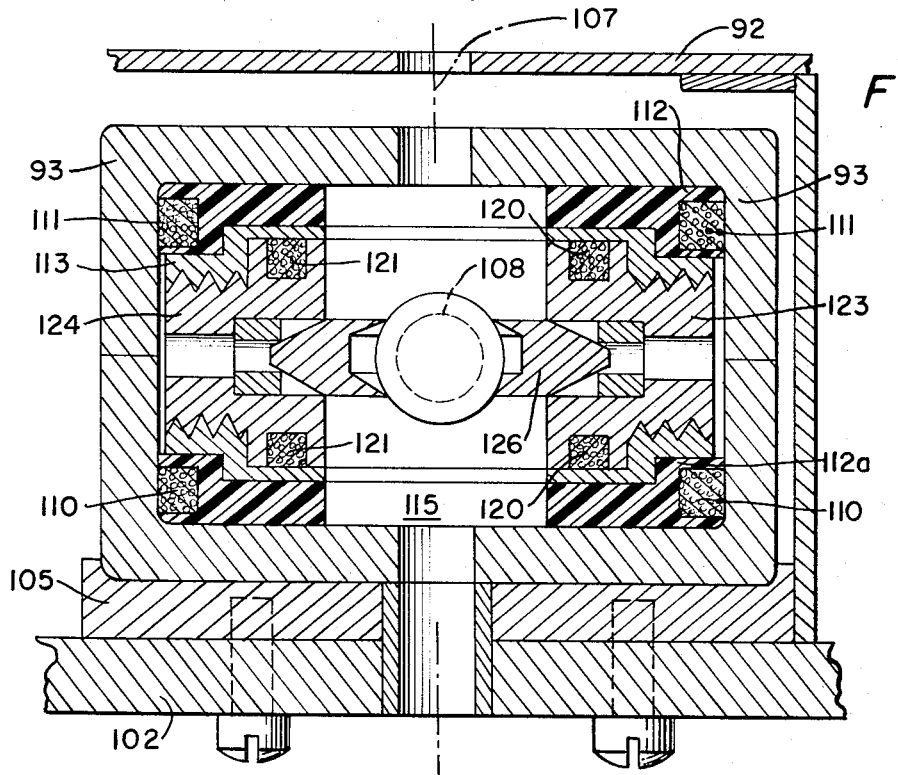
FIG. 5 is a cross-sectional view of the spin generator assembly taken in a plane containing the axes of the $H_1$ and $H_0$ magnetic fields.

FIGS. 4 and 5 show the spin generator assembly as viewed in two different sectional planes. Each plane contains the axis of the coils 110 and 111 that produce the $H_0$ magnetic field. In FIG. 4 the absorption cell has been removed and the sectional plane passes through the centers of the mounting holes for the ferrite shield 93, while in FIG. 5 it passes through the axis of the coils 120 and 121 which produce the $H_1$ magnetic field.

As shown in FIG. 4, a heat shield 92 is secured to a base member 102. The ferrite shield 93 is physically located and held in a secure relationship by a spacer 105 about the coil assemblies. The heat shield 92, the ferrite shield 93, the spacer 105, and the base member 102 have aligned openings 103 in register about the $H_0$ axis designated generally by the reference numeral 107 for the passage of the pumping beam into the absorption cell 108. The cell 108 corresponds to the mercury absorption cells 14 or 15 described in connection with FIG. 1.

The $H_0$ coil windings 110 and 111 are respectively wound on forms 112 and 112a, each having its axis aligned with the axis 107, and generate the $H_0$ field along the axis 107. A coil support 133 is provided for supporting the coil windings 110 and 111 on the forms 112 and 112a. The forms 112 and 112a slip on the outside of the coil support 113 for ease of assembly. Preferably, each of the coils 110 and 111 has a main section for supplying the $H_0$ field and an auxiliary winding for supplying correction fields where necessary.

FIG. 4 is shown with the absorption cell removed from the center cavity 115 of the assembly. A bore 116 is provided for receiving the $H_1$ coil forms and the mounting members for the absorption cell.

As shown in FIG. 5, the $H_1$ coils 120 and 121 are wound on coil forms 123 and 124 respectively. The coil forms 123 and 124 are threadedly secured in the coil support 113 and are recessed to accommodate the absorption cell holder designated generally at 126. The absorption cell 108 is rigidly secured by the absorption cell holder 126 at the center of the spin generator assembly.

A U-tube may be mounted inside the heat shield so that the spin generator assemblies can be heated by circulating a heated fluid through the U-tube. The aluminum mirrors are mounted directly on the base plate to reflect the pumping beams up through the openings in the heat shield and the magnetic shield and into the mercury cell. The quarter wave plates (not shown in FIGS. 4 and 5) for converting the linearly polarized light into circularly polarized light, are mounted on the bottom of the heat shield. The quarter wave plates are mounted in rotatable bushings to permit adjustment. Preferably, the coil forms are made of a linen base phenolic material while the head shield is made from gold-plated copper.

It has been found advantageous to utilize a filter cell comprising a fused quartz vessel containing mercury vapors of $^{199}Hg$ and $^{201}Hg$ positioned in the readout beam between the readout lamp 35 and the beam splitter 40. Such a filter cell serves to remove those components of the light that could be absorbed by the $^{199}Hg$ and $^{201}Hg$ atoms in the cells 14 and 15. The rotation of the plane of polarization by means of the Faraday effect is most efficiently affected at wavelengths somewhat displaced to one side of the center of absorption.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A nuclear magnetic resonance gyroscope which obtains rotational information from the phase of precessing nuclear magnetic moments for determining the angle of rotation of the gyroscope about a sensitive axis and oriented with respect to an arbitrary $x$, $y$, $z$ coordinate system comprising:
 a first and second assorption cell containing a material for producing nuclear magnetic resonance signals from a sample in said cell,
 means for producing at least two unidirectional magnetic fields, the first of said magnetic fields being oriented in a positive $z$ direction and intersecting said first absorption cell, the second unidirectional magnetic field being oriented in a negative $z$ direction and intersecting the second absorption cell,
 means for subjecting each of said first and said second absorption cells to an AC magnetic field in a direction perpendicular to the unidirectional magnetic field,
 a common readout source of randomly polarized light, and
 a Brewster angle polarizer located between said readout source and said first cell for transmitting planar polarized light derived from said randomly polarized light in such a manner as to intersect said first cell and for reflecting planar polarized light derived from said randomly-polarized light in such a manner to intersect said second cell.

2. The gyroscope as set forth in claim 1 and further including output means for comparing the respective phases of the resonance signal produced by each absorption cell to produce a representation of the angle of rotation of the gyroscope.

3. The gyroscope as set forth in claim 2 wherein said output means includes a first detector and a second detector which respectively provide signals for controlling the AC field to each of said first and said second absorption cell.

4. The gyroscope as set forth in claim 2 wherein said output means includes first and second conversion means for respectively converting said first and second readout beams to amplitude modulated beams to produce first and second periodic amplitude varying signals.

5. The gyroscope as set forth in claim 4 wherein said output means includes a first and second linear analyzer respectively arranged to intercept each of said first and second readout beams after passage through said absorption cells and before detection in said output means.

6. The gyroscope as set forth in claim 2 further including an output indicator, a shaft in cooperation with said output indicator to provide an indication of the angle of rotation of said shaft, and a motor for rotating said shaft at an angle proportional to the difference between the phases of the signals from said first cell and said second cell.

7. The gyroscope as set forth in claim 2 wherein each of said first cell and said second cell includes material which produces a pair of nuclear magnetic resonance signals from each sample, the frequency of said signals being separable and arranged so that the plane of polarization of each of said readout beams is oscillated by the Faraday effect at the Larmor frequencies of each of said cells.

8. The gyroscope as set forth in claim 7 wherein said output means compares the phases of the respective signals to produce a signal which controls the DC magnetic field of one of said spin generators.

9. The gyroscope as set forth in claim 8 wherein said first cell is in circuit with a source of oscillation approximately equal to the frequency of one of the signals produced by said first cell and means for comparing the phase of said source of reference frequency with the phase of one of the signals produced by said first cell.

10. The gyroscope as set forth in claim 1 further including means for housing said absorption cell, said housing means including magnetic shielding means for magnetically shielding said first and second absorption cells.

11. The gyroscope as set forth in claim 10 wherein said housing means further includes a pair of $H_0$ coils for generating a DC magnetic field, means for receiving said pair of $H_0$ coils so that each has its axis aligned with an $H_0$ field axis, said $H_0$ field axis intersecting an absorption cell located within said housing, and an $H_0$ coil support member for retaining said $H_0$ coil receiving means in a secured relationship.

12. The gyroscope as set forth in claim 11 wherein said housing means further includes a pair of $H_1$ coils for generating an AC magnetic field, means for receiving said pair of $H_1$ coils so that each has its axis aligned with an $H_1$ field axis, said $H_1$ field axis intersecting an absorption cell located within said housing, and an $H_1$ coil support member for retaining said $H_1$ coil receiving means in a secured relationship.

13. The apparatus as set forth in claim 1 further including pumping means for optically pumping each of said first and said second cells.

14. The gyroscope as set forth in claim 13 wherein said pumping means includes:

a common pumping source of randomly polarized light, and means for transmitting a first planar polarized beam of light derived from said common pumping source of light in such a manner to intersect said first cell and reflecting a second planar polarized beam of light derived from said common source of light in such a manner to intersect said second cell.

15. The gyroscope as set forth in claim 14 wherein said pumping means further includes means for reflecting each of said first and said second planar polarized beams of light in such a manner that said beams respectively intersect said first cell and said second cell in a positive z direction.

16. The gyroscope as set forth in claim 15 further including means for circularly polarizing each of said first and said second pumping beams.

17. The gyroscope as set forth in claim 16 wherein said optical pumping means further includes a first quarter wave plate and a second quarter wave plate for respectively circularly polarizing light in said first plane and in said second plane.

18. The gyroscope as set forth in claim 17 wherein said optical pumping means further includes a first reflector and a second reflector disposed so that said first reflector reflects light in said first plane to intersect said first cell and said second reflector reflects light in said second plane to intersect said second cell.

* * * * *